(12) United States Patent
Heil

(10) Patent No.: US 8,979,163 B2
(45) Date of Patent: Mar. 17, 2015

(54) HOLDING DEVICE FOR FIXING A PORTABLE DRIVER INFORMATION UNIT IN THE INTERIOR OF A MOTOR VEHICLE

(75) Inventor: Alexander Heil, Kelkheim (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/555,459

(22) Filed: Jul. 23, 2012

(65) Prior Publication Data
US 2013/0026777 A1    Jan. 31, 2013

(30) Foreign Application Priority Data

Jul. 29, 2011 (DE) .......................... 10 2011 108 938

(51) Int. Cl.
*B60K 37/02* (2006.01)
*B60R 11/02* (2006.01)
*B60R 11/00* (2006.01)

(52) U.S. Cl.
CPC ......... *B60R 11/02* (2013.01); *B60R 2011/0005* (2013.01); *B60R 2011/0071* (2013.01)
USPC .......................... 296/70; 296/24.34; 296/37.5

(58) Field of Classification Search
CPC ........................................................ B60R 7/06
USPC .................. 296/24.34, 37.1, 37.5, 37.7, 37.8, 296/37.12, 70, 72, 73; 312/319.1; 348/837; 361/679.01; 224/483
See application file for complete search history.

(56) References Cited

U.S. PATENT DOCUMENTS

| 5,202,913 | A  | * | 4/1993  | Lang et al. ................ 455/575.9 |
| 5,822,023 | A  |   | 10/1998 | Suman et al. |
| 6,208,734 | B1 |   | 3/2001  | Ortscheid et al. |
| 6,499,788 | B2 | * | 12/2002 | Ito et al. ......................... 296/70 |
| 6,549,793 | B1 | * | 4/2003  | Baratono ................... 455/569.2 |
| 6,625,426 | B2 | * | 9/2003  | Baratono et al. ........... 455/569.2 |
| 6,663,155 | B1 | * | 12/2003 | Malone et al. ............... 296/37.8 |
| 7,168,749 | B2 | * | 1/2007  | Schmidt et al. ............ 296/24.34 |
| 7,568,670 | B2 | * | 8/2009  | Wang ........................ 248/205.3 |
| 7,685,901 | B2 | * | 3/2010  | Leopold et al. ................. 74/434 |
| 8,104,816 | B2 | * | 1/2012  | Lupton et al. ................ 296/37.1 |
| 2007/0138822 | A1 | * | 6/2007 | Feit et al. ........................ 296/70 |
| 2009/0152418 | A1 | * | 6/2009 | Bury ......................... 248/205.3 |
| 2010/0144404 | A1 |   | 6/2010 | Cavani |
| 2011/0063530 | A1 | * | 3/2011 | Karsch et al. ................. 348/837 |
| 2011/0127392 | A1 | * | 6/2011 | Carter ......................... 248/121 |
| 2011/0240516 | A1 |   | 10/2011 | Fan |
| 2012/0104195 | A1 |   | 5/2012  | Da Costa Pito et al. |

FOREIGN PATENT DOCUMENTS

| DE | 20204080 U1   | 7/2002 |
| DE | 102005035603 A1 | 2/2007 |

(Continued)

OTHER PUBLICATIONS

German Patent Office, German Search Report for Application No. 102011108938.5, dated Feb. 7, 2012.

*Primary Examiner* — Pinel Romain
(74) *Attorney, Agent, or Firm* — Ingrassia Fisher & Lorenz, P.C.

(57) ABSTRACT

A holding device for fixing a portable driver information unit in the interior of a motor vehicle is provided. The holding device includes a first part and a second part. The first part and the second part are swivelable with respect to one another. The first part or the second part has, or both have, a material section through which the portable driver information unit is fixed between the first part and the second part.

16 Claims, 2 Drawing Sheets

(56) References Cited

FOREIGN PATENT DOCUMENTS

| DE | 202008010368 | U1 | 12/2008 |
| DE | 102007046130 | A1 | 4/2009 |
| DE | 202009013607 | U1 | 12/2009 |
| WO | 9746422 | A1 | 12/1997 |

* cited by examiner

HOLDING DEVICE FOR FIXING A PORTABLE DRIVER INFORMATION UNIT IN THE INTERIOR OF A MOTOR VEHICLE

CROSS-REFERENCE TO RELATED APPLICATION

This application claims priority to German Patent Application No. 10 2011 108 938.5, filed Jul. 29, 2011, which is incorporated herein by reference in its entirety.

TECHNICAL FIELD

The technical field relates to a holding device for fixing a portable driver information unit in the interior of a motor vehicle.

BACKGROUND

Holding devices are common today in order to be able to mount portable driver information units in the interior of a motor vehicle. Such a portable driver information unit can be, for example, a portable navigation device, which is fixed by means of the holding device, for example, on the windshield or on the instrument panel. For this, the holding devices usually have a mechanically operable suction part, by means of which a connection takes place to the windshield or to the instrument panel.

The portable driver information unit is usually mounted on a corresponding mount of the holding device. The mount is usually realized by at least one clip connection, in which at least one clip element is clipped into a depression in the housing of the driver information unit.

These holding devices hitherto are relatively complicated with regard to their handling, when the driver information unit is to be applied thereon. This is because, for this, the driver information unit is to be brought exactly in position on the holding device, so that the at least one clip element of the holding device arrives into the depression in the housing of the driver information unit.

Moreover, in the accommodating of portable driver information units, the electric current supply is frequently relatively intricate and impractical. For the electric current supply namely usually a current supply cable is provided, which is inserted by its one end into a cigarette lighter of the motor vehicle and is brought by its other end into a socket of the information unit. As the cigarette lighter is usually housed in the front region of the motor vehicle, for example on the base of the instrument panel, the current supply cable runs visibly along the instrument panel. This is visually not very attractive and, moreover, is intrusive during the handling of possible operating elements on the instrument panel.

The holding devices are also usually only constructed for the connecting of a particular type of a driver information unit. A universal use of different driver information units together with the holding device is usually not possible.

It is at least one object herein to provide a holding device by which a simple handling is enabled on mounting and dismantling a portable driver information unit in the interior of a motor vehicle. Also, a motor vehicle is to be provided, which is suited for the use of such a holding device.

SUMMARY

In accordance with an exemplary embodiment, a holding device for fixing a portable driver information unit in the interior of a motor vehicle has two parts which are swivelable with respect to one another, which have a material section through which the portable driver information unit is able to be fixed or respectively is fixed between the parts.

Through the two swivelable parts, a mobile driver information unit can be mounted in a simple manner on the holding device, namely by the parts being swiveled so far away from one another that the driver information unit can be placed therebetween in the desired manner. Through the material section, a secure connection, withstanding the forces during the travelling of the vehicle, between the driver information unit and the holding device is achieved.

In an exemplary embodiment, at least two material sections are provided, of which one material section is associated with the one part and the other material section is associated with the other part. Preferably, the two material sections act in a fixing manner with regard to the driver information unit.

The portable driver information unit can be a portable driver assistance system. The portable driver information unit can also be a mobile navigation device. Furthermore, the driver information unit can be a portable personal digital assistance system, which is designated as a so-called PDA.

By the swiveling of the two parts with respect to one another, driver information units of different kinds, in particular of different dimensions, can be held in a simple manner without difficulty by the holding device. For this, the parts are to be swiveled away from one another to a greater or lesser extent according to the dimension of the driver information unit, so that a correspondingly dimensioned mount is formed for the driver information unit.

In order to be able to hold the driver information unit permanently and securely by means of the holding device and also to be able to withstand the vibrations during the traveling of the motor vehicle, it is appropriate that the material section has a contour which is at least partially adapted to the shape of the driver information unit. In so far as at least two material sections are provided, the two material sections should have a contour adapted accordingly to the driver information unit.

It is, in addition, appropriate that the material section is arranged at the end region of the associated part, in particular both parts have at their respective free end region a material section to receive the driver information unit.

In an exemplary embodiment, a holding device for fixing a portable driver information unit in the interior of a motor vehicle has two parts which are swivelable with respect to one another, between which a portable driver information unit is able to be clamped.

Through this measure also a simple handling is ensured, in order to mount the driver information unit on the holding device. For this, it is merely necessary to swivel the two parts away from one another, so that the driver information unit can be positioned in the sought manner between the parts. Through the clamping force of the two parts with respect to one another, the fixing in position of the driver information unit then takes place relatively with respect to the holding device. The fixing of the driver information unit therefore takes place through the parts themselves which are mounted swivelably with respect to one another, which press against the driver information unit by means of a pressure force.

In another exemplary embodiment, in the clamped state of the driver information unit, the two parts which are swivelable with respect to one another press against the driver information unit through the force at least of one spring element. Thereby a holding device is realized in a technically simple manner, in which the parts which are swivelable with respect to one another press on the driver information unit lying therebetween and thereby fix the driver information unit.

According to a further embodiment, the parts are swivelable away from one another against the force at least of one spring element or a spring element of the type described above. Thereby, on the swiveling of the parts away from one another a restoring force is built up, which acts on the driver information unit held between the parts and serves for the fixing of the driver information unit between the parts.

It is appropriate that the parts in the initial state are pressed against one another by the force of one or more spring elements. The spring element is therefore situated under pre-stressing, when the parts are present pressed against one another in the initial state. In the initial state, a driver information unit is not held between the parts.

In an exemplary embodiment, a holding device for fixing a portable driver information unit in the interior of a motor vehicle has a connection cable, which is able to be electrically connected with the driver information unit via a connecting element, and a mechanism by which at least the connection cable is automatically transferred into a stowage space or respectively storage space on the dismantling of the driver information unit.

Thereby, the holding device enables a particularly simple handling on mounting or respectively dismantling of the driver information unit, because the holding device has available a connection cable in order to thereby connect the driver information unit for example to the electric current supply. On dismantling of the driver information unit, the holding device enables a particularly favorable handling, because an intrusive exposed connection cable is avoided by the mechanism which is provided. This is because, on dismantling of the driver information unit, by means of the mechanism a transferring of the connection cable into the stowage space is achieved in an automatic manner.

The embodiment, according to which the connection cable is provided, which is able to be electrically connected with the driver information unit via a connecting element, and is transferred automatically into a stowage space or respectively storage space by means of a mechanism at least on dismantling of the driver information unit, can also be regarded as an embodiment of one of the holding devices of the type described above.

According to an embodiment, the mechanism has one or more spring elements, by the force of which the connection cable is transferred into the stowage space or respectively storage space. Thereby, in a technically particularly simple manner, an automatic returning of the connection cable into the stowage space or respectively storage space is realized, when the connecting element has been released from the connection on the driver information unit.

The spring force can be activated by a triggering event, so that on triggering of the event the spring force acts on the connection cable and the connection cable is automatically returned into the stowage space.

The force of the spring element can also act permanently on the connection cable, so that thereby the connection cable can be connected in a tightened manner on the driver information unit. The connection cable is thereby only drawn out from the stowage space in the length which is necessary for connecting to the driver information unit.

According to a further embodiment, the connection cable is able to be brought out from the stowage space against the force of the spring element. Thereby, the restoring force of the spring element is used by the mechanism which has been built up on withdrawal of the connection cable from the stowage space, in order to automatically move the connection cable back into the stowage space in the course of the dismantling from the driver information unit.

Preferably, the connection cable is present in the stowage space in rolled-up form, so that by the withdrawal the connection cable is unrolled from a cable roll and in so doing a spring element provided in the cable roll is tensioned. Preferably, the spring element which is provided in the cable roll is already installed under pre-tension, so that already in the case of a rolled-up connection cable the connecting element of the connection cable is pressed against a mount and hence, for example, during the travel of the vehicle a moving out of the connecting element from the mount owing to possible vibrations is avoided.

According to a further embodiment, the connection cable and connecting element are a component of the current supply connection of the connection for a GPS antenna and/or of the connection for other external devices. The current supply connection can be realized for example via a USB connection. Other forms of connection, in particular other types of connecting element, are possible for the electric current supply connection. Also, for example, GPS mice can be connected by means of the connecting element. Therefore a great variety of different types of connections are able to be used by means of the connection cable and the connecting element.

According to a further embodiment, several connections can be provided. For example, a connection cable and a connecting element can be constructed for the electric current supply, and a further connection cable with a further connecting element can serve for the GPS antenna.

According to a further aspect, an instrument panel for a motor vehicle with a holding device of the type described above is provided.

It is appropriate that one of the two parts of the holding device which are swivelable with respect to one another is formed by a wall of the instrument panel, and the other part is formed by a flap part which is able to be swiveled against the wall. Thereby, the holding device is integrated into the instrument panel in a visually particularly attractive manner.

Without a held driver information unit, the flap part is preferably swiveled against the wall of the instrument panel, so that preferably the flap part does not project out from the instrument panel in this state and is hence visually inconspicuous. The flap part is only swiveled away outwards in the course of the mounting of the driver information unit and it therefore stands towards the exterior away from the instrument panel, in order to be able to receive the driver information unit between the flap part and the wall.

With a dismantled driver information unit, the flap part is closed and therefore the connection cable and the connecting element are no longer visible from the exterior.

According to a further embodiment, the connection cable of the holding device is countersunk in the wall. Thereby, the connection cable and preferably also the connecting element arranged thereon does not appear visually toward the exterior, when the driver information unit is not mounted and hence the flap part in the closed state is present swiveled against the wall. Only by opening of the flap part is the connection cable with the connecting element accessible from the exterior and can be withdrawn from the wall by the operator for connection to the driver information unit.

In a further embodiment a motor vehicle with a holding device of the type described above is provided.

The motor vehicle, in an embodiment, has an instrument panel of the type described above, on which the holding device of the type described above is constructed.

A mobile driver information unit can be fixed detachably to the instrument panel of a motor vehicle by simple handling. In an embodiment, the connection of the driver information unit is preferably realized by an extendable USB cable connection with an automatic rolling-up arrangement. Preferably, the connection cable is drawn back automatically into a parked position, when it is not required or is dismantled from the driver information unit. The driver information unit can be fixed to the instrument panel in a simple manner. A spring pre-stressed covering flap in the instrument panel can serve for this, which is drawn upward against the force of a spring and on releasing clamps the driver information unit securely. Preferably, the USB connection cable together with the connection plug is positioned invisibly under the flap.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
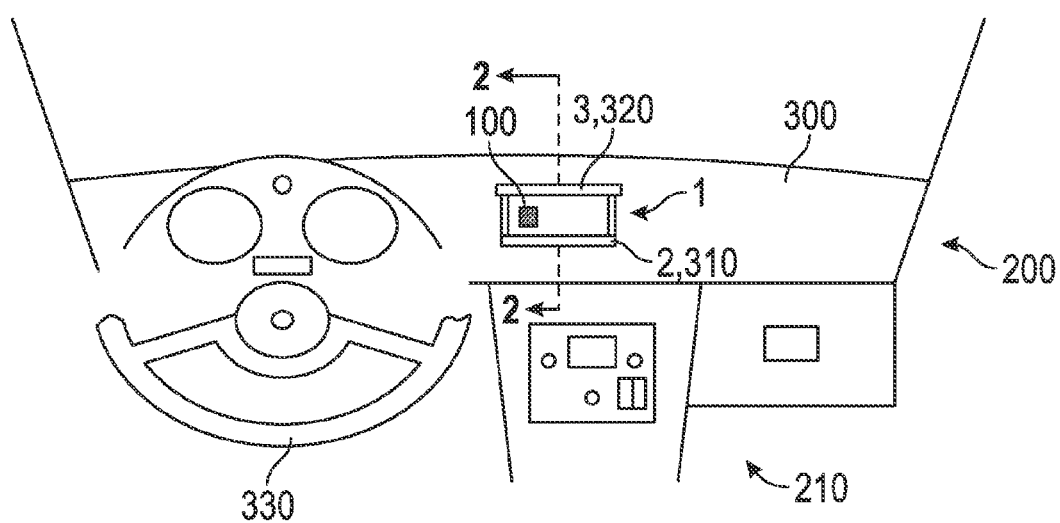
FIG. 1 is schematic illustration of an instrument panel of a motor vehicle with a holding device for fixing a portable driver information unit in accordance with an exemplary embodiment.

FIG. 1 shows the interior 210 of a motor vehicle 200 with a view onto the instrument panel 300 of the motor vehicle 200. The instrument panel 300 has for example laterally adjacent to the steering wheel 330 a holding device 1 for fixing a portable driver information unit. As can be seen from FIG. 1, such a driver information unit 100 is mounted in the holding device 1.

Figure 2:
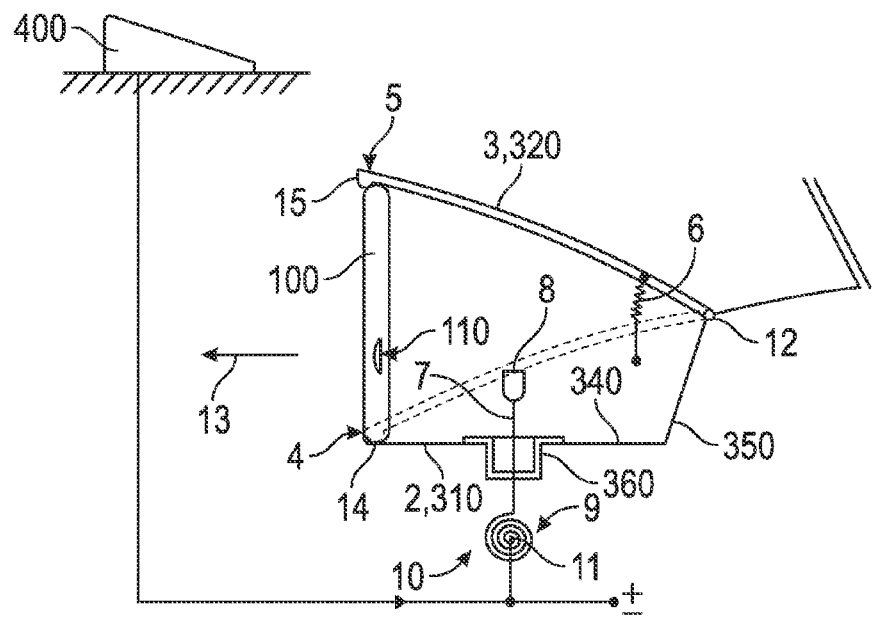
FIG. 2 is the instrument panel with the holding device for fixing a portable driver information unit according to FIG. 1 in sectional representation along the section line A-A of FIG. 1 depicting the holding device in an open position.

FIG. 2 shows the instrument panel 300 with the holding device 1 in sectional representation according to the section line A-A of FIG. 1. As can be seen therefrom, the holding device 1 has two parts 2, 3 which are swivelable with respect to one another, between which the portable driver information unit 100 is arranged, in particular, is fixed when the second part 2 is in an open position.

In an embodiment, the parts 2, 3 are connected swivelably with one another at their one end or respectively end region in a swivel axis 12.

The parts 2 and 3 have at their end lying opposite the respective swivel axis 12 a material section 4 or respectively 5, which is brought into operative position with the driver information unit 100. The material sections 4, 5 are preferably constructed in a manner such that a slipping out of the driver information unit 100, held between the parts 2 and 3, in the direction according to arrow 13 is prevented. For this, the material sections 4, 5 preferably have respectively a projection formed towards the exterior in the direction of the driver information unit 100, so that the projections of the parts 2, 3 are facing one another.

As can be seen in addition from FIG. 2, one of the two parts 2, 3 which are swivelable with respect to one another, is formed by a wall 310 of the instrument panel 300 and the other part 3 is formed by a flap part 320 which is swivelable against the wall 310. Preferably, the wall 310 is constructed as an indentation into the instrument panel 300, with a section 340 running substantially horizontally, and with a section 350 running angled thereto, in particular running substantially vertically. Preferably, at the upper end of the vertical section 350 the swivel axis 12 is arranged of the parts 2, 3 which are swivelable with respect to one another.

Figure 3:
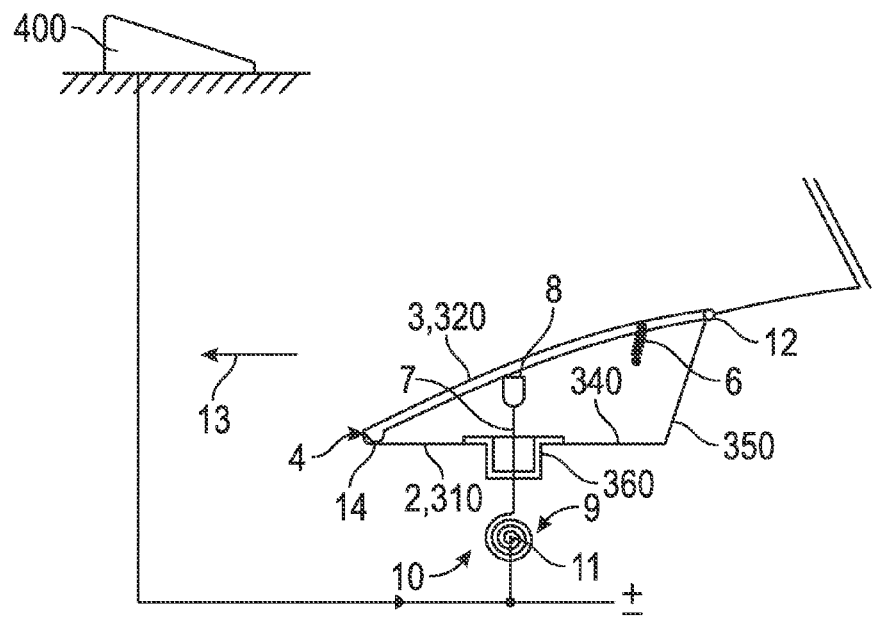
FIG. 3 is a view of the holding device of FIG. 2 in a closed position.

The flap part 320 is preferably constructed such that without holding the driver information unit 100, the flap part 320 is present swiveled against the wall 310 of the instrument panel 300 in a closed position. Preferably, the flap part 320 in this state is substantially flush with the upper side of the instrument panel 300 as shown in FIG. 3.

The flap part 320 is preferably connected with a spring element 6, so that on opening of the flap part 320 upwards, the spring element 6 is tensioned and hence a spring force is built up. In this way, the flap part 320 is biased by the spring element 6 from when in the open position to return to the closed position, as shown in FIGS. 2 and 3.

After the opening of the flap part 320, the driver information unit 100 is positioned between the ends of the flap part 220 and the wall 310 preferably on the material sections 4 and 5. In this state, the open position, the flap part 320 presses by the force of the spring element 6 against the driver information unit 100, which is thereby present clamped between the flap part 320 and the wall 310.

For the electric current supply, a connection cable 7 is provided, which can be electrically connected via a connecting element 8 with a connection 110 which is present on the driver information unit 100.

The connecting element 8 and the connection 110 can be constructed as a USB connection and form a USB cable connection together with the connection cable 7.

Alternatively or in addition, the connection cable 7 can also transmit the signals of a GPS receiver 400 and hence supply the driver information unit 100 with corresponding signals of the GPS receiver 400.

In an embodiment, the connection cable 7 is passed through a passage opening in the wall 310 and projects with the connecting element 8 into the intermediate space between the wall 310 and the flap part 320.

Preferably a mount 360 is arranged in the wall 310, in order to receive the connecting element 8 therein.

A mechanism 9 acts on the connection cable 7, by which the connection cable 7 together with the connecting element 8 on dismantling of the driver information unit 100 is automatically transferred into a stowage space 10. The stowage space 10 is preferably arranged inside the instrument panel 300 and can have a roll on which the connection cable 7 rolls up automatically.

The mechanism 9 preferably has at least one spring element 11, by which the connection cable 7 is automatically drawn back into the stowage space 10 or respectively is rolled onto the roll, when the connecting element 8 is uncoupled from the connection 110 of the driver information unit 100 and is released by the installer of the driver information unit. The connecting element 8 is then automatically moved back into the mount 360 and is preferably held in the mount 360 under a holding force generated by the spring element 11.

In an embodiment, the mechanism 9 is constructed such that on withdrawing of the connection cable 7 or respectively of the connecting element 8 from the mount 360, withdrawal is carried out against the restoring force of the spring element 11 and hence the restoring force acts in a restoring manner on the connection cable 7 and the connecting element 8 and after releasing by the installer the moving back is carried out automatically.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A holding device for fixing a portable driver information unit in the interior of a motor vehicle, the holding device comprising:
    a first part;
    a second part, wherein the second part is swivelable with respect to the first part between an open position and a closed position, and wherein the first part or the second part has, or both have, a material section through which the portable driver information unit is fixed between the first part and the second part when the second part is in the open position; and
    a mechanism by which a connection cable is transferred automatically into a stowage space on dismantling of the portable driver information unit, wherein the mechanism has a spring element by a force of which the connection cable is transferred into the stowage space and wherein the connection cable is brought out from the stowage space against the force of the spring element.

2. The holding device according to claim 1, wherein the portable driver information unit is clamped between the first part and the second part when the second part is in the open position.

3. A holding device for fixing a portable driver information unit in the interior of a motor vehicle, the holding device comprising:
    a first part;
    a second part, wherein the second part is swivelable with respect to the first part between an open position and a closed position, and between which the portable driver information unit is clamped when the second part is in the open position; and
    a mechanism by which a connection cable is transferred automatically into a stowage space on dismantling of the portable driver information unit, wherein the mechanism has a spring element by a force of which the connection cable is transferred into the stowage space and wherein the connection cable is brought out from the stowage space against the force of the spring element wherein the first part or the second part of the holding device is formed by a wall of the instrument panel and the remaining part is formed by a flap part that is swivelable against the wall.

4. The holding device according to claim 3, wherein when the portable driver information unit is clamped by the first part and the second part, the first part and the second part press against the portable driver information unit by a force of a spring element.

5. The holding device according to claim 3, wherein the second part is swivelable away from the first part against a force of a spring element.

6. The holding device according to claim 3, further comprising the connection cable that is electrically connected via a connecting element to the portable driver information unit.

7. The holding device according to claim 3, further comprising:
    a connecting element that electrically connects the connection cable to the portable driver information unit.

8. The holding device according to claim 7, wherein the connection cable and the connecting element are a component of a current supply connection, of a connection for a GPS antenna, and/or of a connection for another external device.

9. An instrument panel for a motor vehicle with a holding device comprising:
    a first part;
    a second part, wherein the second part is swivelable with respect to the first part between an open position and a closed position, and between which a portable driver information unit is clamped when the second part is in the open position; and
    a mechanism by which a connection cable is transferred automatically into a stowage space on dismantling of the portable driver information unit, wherein the mechanism has a spring element by a force of which the connection cable is transferred into the stowage space and wherein the connection cable is brought out from the stowage space against the force of the spring element.

10. The instrument panel according to claim 9, wherein the first part of the holding device is formed by a wall of the instrument panel and the second part is formed by a flap part that is swivelable against the wall.

11. The instrument panel according to claim 10, wherein a connection cable of the holding device is arranged on the wall.

12. The instrument panel according to claim 11, wherein the connection cable of the holding device is arranged countersunk in the wall.

13. A motor vehicle with a holding device comprising:
    a first part;
    a second part, wherein the second part is swivelable with respect to the first part between an open position and a closed position, and wherein the first part or the second part has, or both have, a material section through which a portable driver information unit is fixed between the first part and the second part when the second part is in the open position; and
    a mechanism by which a connection cable is transferred automatically into a stowage space on dismantling of the portable driver information unit, wherein the mechanism has a spring element by a force of which the connection cable is transferred into the stowage space and wherein the connection cable is brought out from the stowage space against the force of the spring element.

14. The motor vehicle according to claim 13, wherein the first part of the holding device is formed by a wall of an instrument panel of the motor vehicle and the second part is formed by a flap part that is swivelable against the wall.

15. The motor vehicle according to claim 14, wherein the connection cable of the holding device is arranged on the wall.

16. The motor vehicle according to claim 15, wherein the connection cable of the holding device is arranged countersunk in the wall.

* * * * *